Jan. 16, 1962 W. G. PETERSON ETAL 3,016,647
DEVICE FOR ATTRACTING WILD GEESE AND DUCKS
Filed April 20, 1959 2 Sheets-Sheet 1
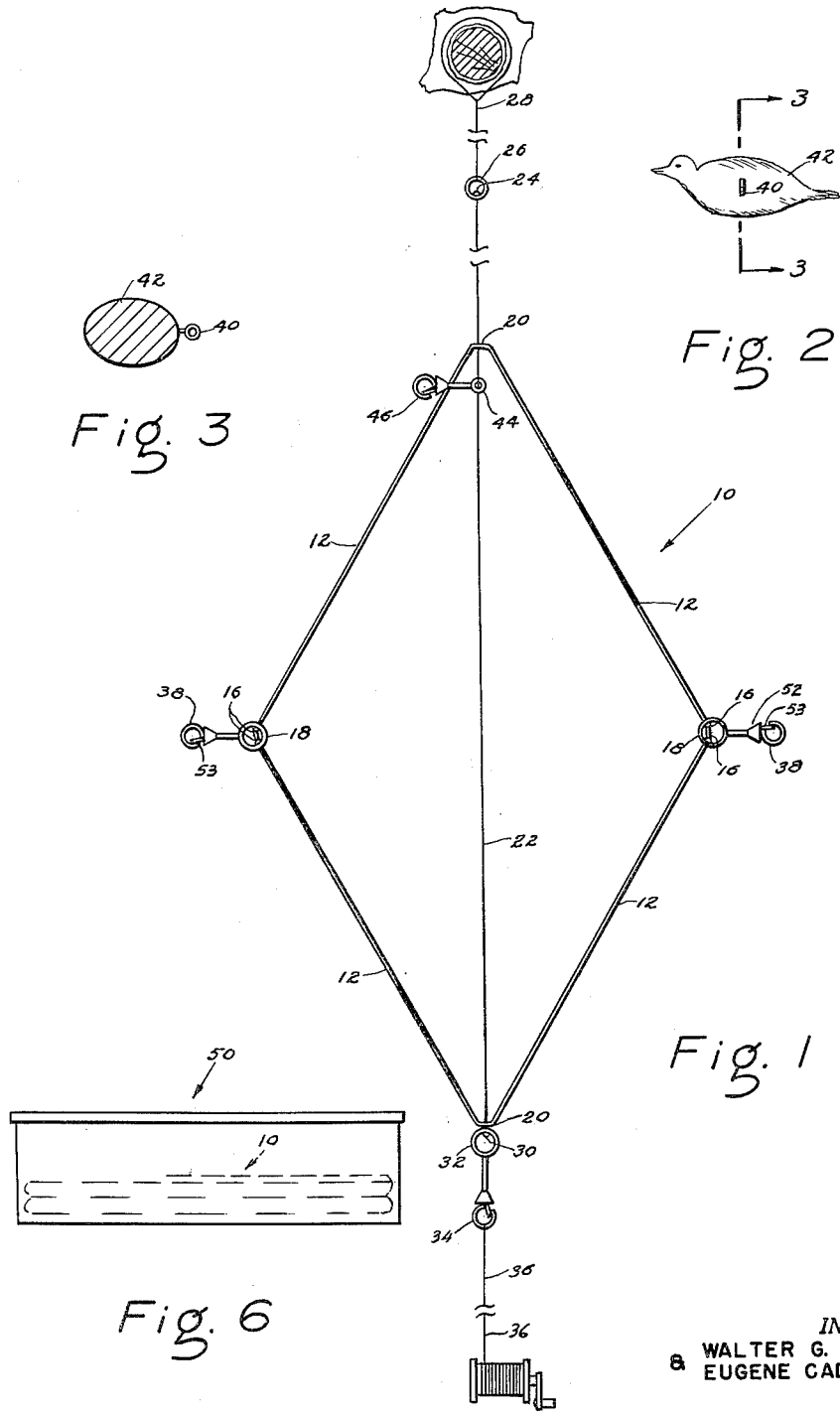
INVENTORS
WALTER G. PETERSON
& EUGENE CADWALLADER

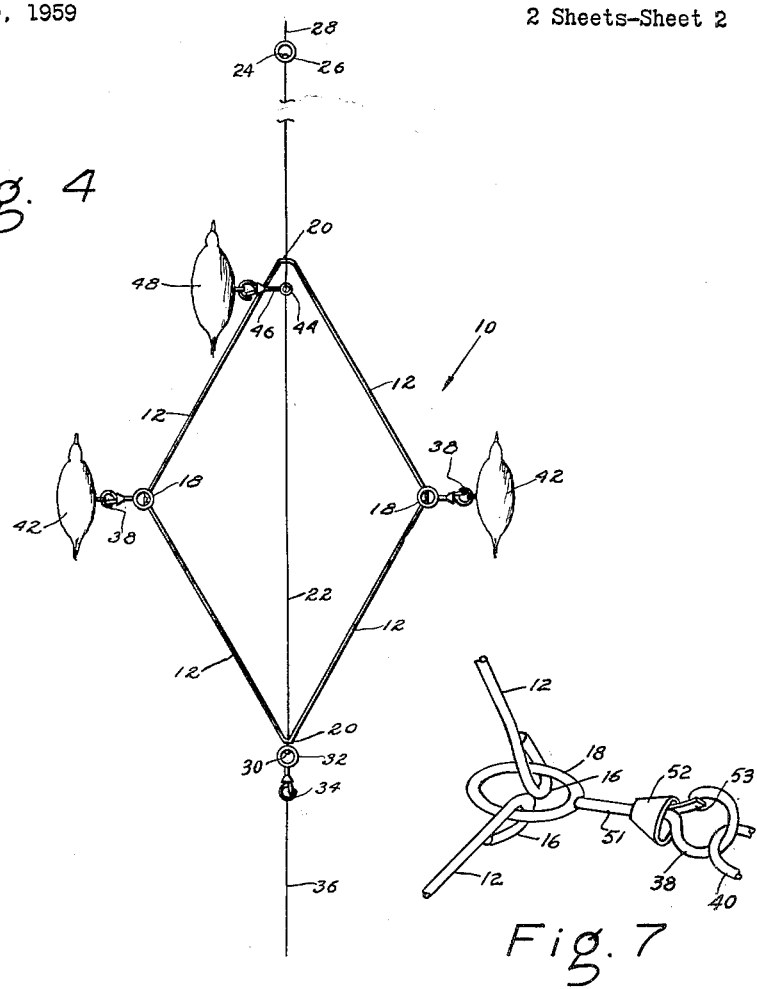
Fig. 4
Fig. 7
Fig. 5
*INVENTORS*
WALTER G. PETERSON
& EUGENE CADWALLADER

United States Patent Office 3,016,647
Patented Jan. 16, 1962

3,016,647
DEVICE FOR ATTRACTING WILD GEESE
AND DUCKS
Walter G. Peterson, Eugene, and Eugene Cadwallader,
Springfield, Oreg., assignors of ten percent to Gadget-
Of-The-Month Club, Inc., North Hollywood, Calif., a
corporation of California
Filed Apr. 20, 1959, Ser. No. 807,557
7 Claims. (Cl. 43—3)

This invention relates to hunting apparatus and more particularly to a decoy array.

It is an object of the present invention to provide a decoy array for attracting wild geese and ducks to improve the possibilities of shooting such wild game during hunting trips.

Another object of the present invention is to provide a decoy array that closely simulates the actual behavior of wild game so as to attract rather than to dispel wild game from hunting areas.

Still another object of the present invention is to provide a decoy array of the above type that is collapsible and transportable in a small area when not in use, so as to facilitate the carrying and storage thereof.

Other objects of the invention are to provide a decoy array bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a top plan view of a decoy array made in accordance with the present invention, with the decoy elements removed therefrom;

FIGURE 2 is a side elevational view of a decoy forming a part of the present invention;

FIGURE 3 is a transverse cross sectional view taken along line 3—3 of FIGURE 2;

FIGURE 4 is a view similar to FIGURE 1, with the decoy elements attached;

FIGURE 5 is a side elevational view of the decoy array made in accordance with the present invention in operative use;

FIGURE 6 is a side elevational view of a package containing a folded decoy array made in accordance with the present invention in a storage position; and FIGURE 7 is a fragmentary, enlarged, perspective detail view of one of the pivotal connections between front and rear portions of one of the frame sides.

Referring now more in detail to the drawing, a decoy array 10 made in accordance with the present invention is shown to include a substantially rhombic shaped flexible frame 12 having a pair of resilient sides each having a central portion 16 pivotally connected to and mounting a ring 18 with a swivelled side fastener 38 carried thereon. Each opposite end of the frame is provided with a slightly offset terminal portion 20 comprising aperture-defining means having an aperture through which a longitudinal means comprising a wire rod 22 is slidably supported. The length of the rod 22 is substantially twice the length of the rhombic frame between the opposite terminal portions 20 thereof.

Each end of the rod 22 has a head 24, 30 that pivotally supports a securement ring 26, 32. One such ring 26 serves as an anchor for one end of an elastic cable 28 that may be attached at its opposite end to a stationary object, such as a log in the water or the shore line, while the opposite ring 32 serves as an anchor for a fastener 34 to which an inelastic cable 36 is secured at one end. The opposite end of the inelastic cable 36 is fastened to a manually operated reel, so that a hunter may draw the frame toward him in a boat against the elastic action of the elastic cable 28.

Each side fastener 38 releasably engages a screw eye 40 on the side of each one of a pair of side decoys 42. However, a center fastener 46 clamped to the center of the rod 22 by means of a coupling 44, is releasably fastened to a lead decoy 48 which is intended to move longitudinally back and forth between the side decoys 42 so as to face in a forward direction at all times and serve as a lead decoy for the other two decoys 42.

FIG. 7 best illustrates the detail of the two side pivotal connections between the front and rear portions of the two frame sides 12 and shows the side portions 12 as each being provided with a central portion 16 pivotally connected to and mounting a ring 18 which is connected by a member 51 to a conical swivel base portion 52 carrying the hook-shaped fastener 38 and also carrying the controllably openable and closable resilient locking tongue 53 whereby to releasably engage the screw eye 40. The corresponding structure carried at the center left portion of the rhombic-shaped flexible frame 12 as shown in FIGS. 1 and 4 is of similar construction.

In actual use, the free end of the elastic cable 28 is secured to a stationary object in or near the water. With the side decoys 42 attached to the side fasteners 38, the lead decoy 48 is attached to the center fastener 46 secured to the rod 22. The elastic cable 28 draws the decoy 48 toward the adjacent end of the rhombic frame when under tension and when the tension on the inelastic cable is slackened, the winding of the inelastic cable 36 by the hunter at a remote location also is operative to draw the lead decoy 48 from the one end of the frame to the other against the bias of the elastic cable, to thus assume the lead relative to the side decoys 42, following which the three decoys are drawn as a unit through the water to a point close to the hunter. This gives the impression that the lead decoy is moving up to take the lead of the decoys, thus simulating the actual behavior of wild game. By then unwinding the reel, the inelastic cable 36 allows the lead decoy to return to the opposite end of the frame, following which the elastic cable 28 will draw the entire rhombic frame toward the anchor point of the elastic cable 28, so that the lead decoy again assumes a lead position during the return movement of the frame. This movement of the lead decoy 48 is shown in phantom lines in FIGURE 5 as the wire rod 22 slides through the ends of the frame to accommodate this movement. The double length of the rod relative to the length of the frame enables the rod to slide sufficiently to allow the coupling 44 to move from one end of the frame to the other during use.

When not in use, the flexible frame is rotated at each of the rings 18 into a collapsed position, and the parts stored within a container 50, as shown in FIGURE 6. The resilient nature of the sides of the frame and the pivotal connection therebetween by each of the rings 18 enables the entire decoy array to be stored in a relatively small space.

While various changes may be made in the detail construction, it shall be understood that such changes shall be within the spirit and scope of the present invention as defined by the appended claims.

What we claim as new and desire to protect by Letters Patent of the United States is:

1. A decoy array for wild geese and ducks comprising, in combination, a frame having opposite sides and ends, a pair of decoys, releasable fastening means securing said pair of decoys on said opposite sides of said frame, a lead decoy, longitudinal means, releasable fastening means securing said lead decoy to said longitudinal means at a longitudinally intermediate location therealong, said frame having longitudinally directed apertures longitudinally slidably receiving said longitudinal means, said lead decoy being secured to said longitudinal means laterally intermediate said pair of decoys for reciprocating sliding movement therewith from one end of said frame to the other in response to longitudinally reversed direction of movement of said longitudinal means through a body of water and with respect to said frame.

2. The combination according to claim 1, wherein said frame is of generally rhombic shape, said rhombic frame having a first pair of longitudinally spaced apart apices, and a second pair of laterally spaced apart apices.

3. The combintion according to claim 2, wherein said first-mentioned releasable fastening means comprises a pair of fasteners, each being secured to one of said second pair of laterally spaced apart apices of said rhombic frame.

4. The combination according to claim 3, wherein said longitudinal means comprises an elongated rod of substantially twice the length of said rhombic frame, said apertures being formed in said first pair of longitudinally spaced apices, and said lead decoy being secured to the center of said rod for movement between said first pair of longitudinally spaced-apart apices.

5. The combination according to claim 4, further comprising a ring secured to one end of said rod for attachment to a free end of an elastic cable which is adapted to have its opposite end anchored, and a ring secured to the opposite end of said rod for attachment to one end of an inelastic cable.

6. The combination according to claim 5, wherein the opposite free end of said elastic cable includes means for anchoring said elastic cable upon a stationary object.

7. The combination according to claim 6, wherein the opposite free end of said inelastic cable includes means for attachment to a winding reel.

References Cited in the file of this patent

UNITED STATES PATENTS 2,252,795   Weems et al. _____ Aug. 19, 1941